April 4, 1967

J. C. GAMBALE 3,312,865

STATIC REACTANCE RELAY

Filed Oct. 21, 1963

WITNESSES

INVENTOR
John C. Gambale
BY
ATTORNEY

April 4, 1967 J. C. GAMBALE 3,312,865
STATIC REACTANCE RELAY
Filed Oct. 21, 1963 5 Sheets-Sheet 2

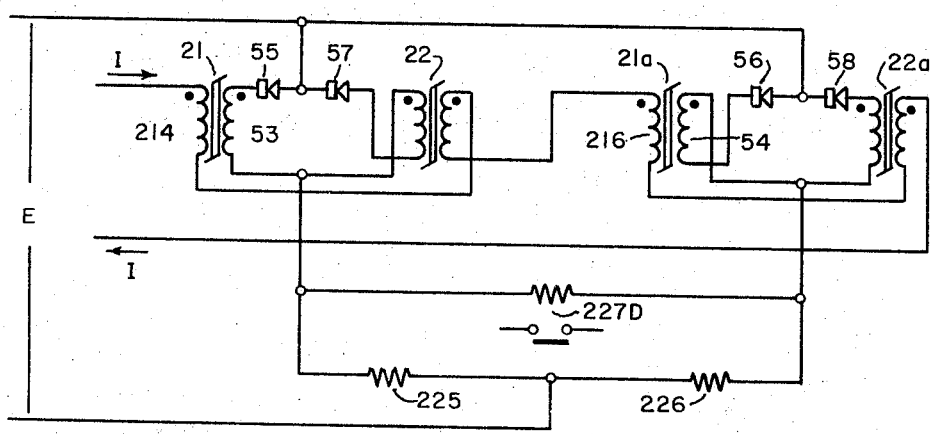
Fig. 5
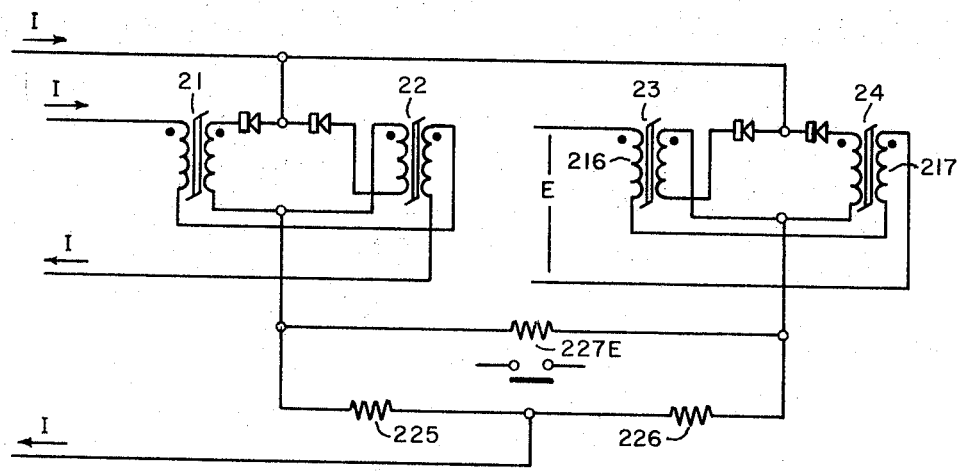
Fig. 6
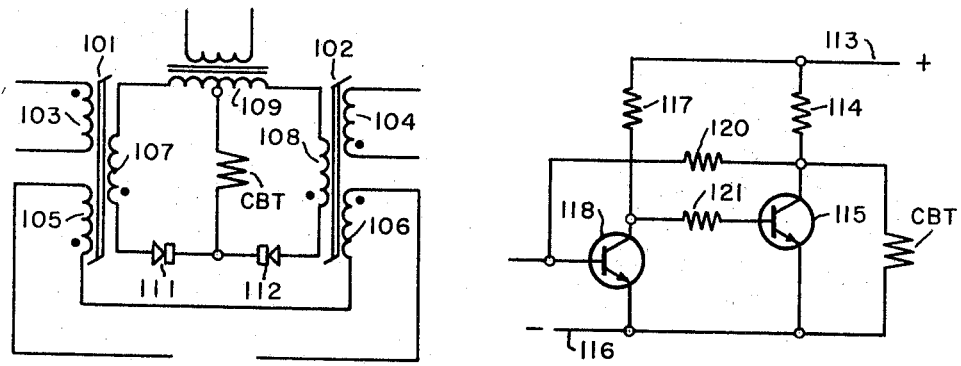
Fig. 11
Fig. 12

April 4, 1967     J. C. GAMBALE     3,312,865
STATIC REACTANCE RELAY

Filed Oct. 21, 1963     5 Sheets-Sheet 5

United States Patent Office 3,312,865
Patented Apr. 4, 1967

3,312,865
STATIC REACTANCE RELAY
John C. Gambale, Livingston, N.J., assignor to Westinghouse Electric Corporation, East Pittsburgh, Pa., a corporation of Pennsylvania
Filed Oct. 21, 1963, Ser. No. 317,506
7 Claims. (Cl. 317—27)

My invention relates to relay systems for the protection of alternating current circuits, and in particular to distance relays of the reactance type. In particular it provides a relay system in which most, or if desired all, of the controlling components are of a static type involving no mechanical movements, and employing magnetic amplifiers.

Electric power systems today cover wide areas of territory, and form networks of alternating current lines frequently of the order of hundreds of miles in length. From time to time accidents happen to some of the numerous parts of such a system; line conductors break and fall to the ground, or are short circuited; insulators fail on line towers or in power installations; and so on, to the number of legion. To protect generating apparatus in the near vicinity of the fault without interrupting service to customers over the entire power system is of course, highly desirable and a number of different protective systems employing circuit-interrupters and relays located at various points on the system have been devised for this purpose. These respond to the existence of a fault to cut off portions of the system near the fault from the wide network, but leave the more distant generators and line-sections in continued operation.

Among the most effective of these protective systems make use of the fact that the reactance per mile of a power transmission line of usual type is a fairl definite known quantity, and employ so-called reactance-type relays to isolate the system portions which are near the fault. When a line conductor contacts, or "short-circuits to," the ground or another line conductor one limitation to the amount of current that will flow to the fault from any electric generator of the power system is in the electrical impedance of the line conductors between that generator and the fault; and this impedance is proportional to the product of a practically constant line-impedance-per-mile by the distance along the line from generator to fault. A relay which can measure the impedance betwen itself and a fault can thus give a measurement of its own distance from the fault. However, the impedance which the relay faces, or finds itself "looking into," is only a rough measure of the fault distance in some types of fault since the latter may embody resistance additional to the of the line conductors; but almost never reactance additional to that of the line conductors. Therefore relays which open line circuit breakers when they "look into" reactances smaller than a setting value, but remain unresponsive when looking into reactances larger than that in value, can be relied upon to isolate from the rest of the power system the portion thereof near a fault, but to leave the bulk of the system in continued operation. My present invention is herein applied to such relay systems.

However, while relay systems responsive purely to reactance measurement have fields of use, there are instances where arrangements in which power customers loads located fairly near a relay station will present highly resistive loads of low reactance to the line, and substantially the only reactance which the relays "looking into" the line would see would be the small reactance of the load and of a short stretch of line. Pure reactance relays would then isolate the line and cut off the customers' service when the actual current being drawn was much less than that due to a "short circuit" or fault. Therefore there is a field for a modified reactance relay which is "supervised" so that it is nonresponsive to current-flow through resistance of greater than a fixed value, no matter I have, accordingly, applied my present invention also to provide a resistance-supervised type of reactance relay.

Since relays are frequently positioned at an intermediate point of a transmission line, and it is desirable to have them respond to faults located on a line stretch extending to one side but not the other, from the relay, I have also applied my present invention to a "directional" component for the relay systems which renders the relay response as to the direction from the relay in which the fault is positioned.

Adequate protection of an alternating current system against the numerous types of fault frequently requires ter how low the reactance presented to the relay may be. the provision at a relay station of many relays and so requires draft from the power line of substantial current and the provision of current and potential transformer capacity of considerable magnitude and cost. For this and other reasons there is a field for relays operating through amplifiers. Needless to say, amplifiers of types incapable of long continued use without attention or renewal can hardly be tolerated in such service. One advantage of my present invention is that it employs magnetic amplifiers, and that these are of a type of great durability, and highest reliability in continuous service. While mechanical relays have been employed for years, it is notorious that they require constant attention and care, and that this becomes a complex matter when the number cooperating in any arrangement is as high as is characteristic of modern protection relay systems. It is, accordingly, a valuable feature of my present invention that it minimizes, and if desired reduces to zero, the number of mechanically-moving relays and employs static electric-circuit components in performing their functions.

It is, accordingly, one object of my present invention to provide a new and improved form of relay system for protecting alternating current circuits against short circuit and other faults.

It is another object of my invention to provide an improved relay system of the reactance-relay type for alternating current circuits.

Another object of my present invention is to provide a new reactance resistance-supervised relay system for protection of alternating current lines.

Another object is to provide a new resistance-type relay arrangement for alternating current lines.

Another object is to provide an improved direction-responsive protective system for alternating current circuits.

Another object is to provide alternating current circuits with improved protective relays operated through amplifiers, and these of a form which has maximum reliability and capable of continuous long unsupervised service.

Another object is to provide improved protective relays utilizing components devoid of moving parts and using well-known and readily available electrical components.

Still another object is to provide a relay whose actuation is responsive to the difference between a direct-current voltage proportional to the square of the current in an alternating current line and another direct-current voltage proportional to the reactive power in that line.

Still another object is to provide a relay whose actuation is responsive to the difference between a direct-current voltage proportional to the square of the current in an alternating current line and another direct current voltage proportional to the power in that line.

These and other objects of my invention will be evident to those skilled in the art upon reading the following description, taken in connection with the drawings in which:

FIG. 5 is a schematic diagram of a relay of the direction-responsive type embodying principles of my invention;

FIG. 6 is a schematic diagram of a relay of a type responsive to resistance and utilizing principles of my invention;

FIG. 11 is a schematic diagram of one static type of polar relay device using magnetic amplifiers; and FIG. 12 is a similar diagram of another static type polar relay device using a flip-flop transistor circuit.

Figure 1:
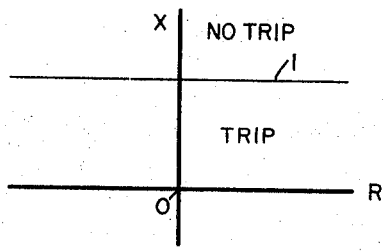
FIGURE 1 is a graph showing a characteristic curve for a reactance relay, and useful in explaining my invention.

Referring in detail to the drawings, FIG. 1 illustrates the conditions under which a pure reactance-relay operates. In that figure abscissas are plotted as the resistance of a circuit protected by the relay, and ordinates as the reactance. Thus, the impedance of any circuit will be represented by some point having an abscissa corresponding to the resistance of the circuit, and an ordinate corresponding to the reactance thereof. The horizontal line 1 is the locus of the impedance of all circuits, regardless of their resistance, which contain the reactance represented by the ordinate of 1. A reactance relay adjusted to be actuated when the reactance of the circuit is less than the ordinate of curve 1, but to remain unactuated when the reactance of the circuit is of value greater than that value, is accordingly properly represented by the line 1 as a characteristic curve. Mechanical relays which so operate are known in the present art. It may comprise, in effect, a lever rotated about its fulcrum, clockwise for instance by a magnet-winding on which line voltage is impressed, and counterclockwise by a second magnet-winding traversed by line current. As long as the line current magnet pull is weaker than that due to the other magnet, the lever is held against a stop against its clockwise rotation. As soon as the current magnet outpulls the other magnet the lever moves counterclockwise and closes an auxiliary-circuit contact to trip a circuit breaker or perform some similar function.

The use of a mechanical relay as the output element for applicant's relays is however by no means imperative since there are arrangements of purely static electrical circuit elements which have critical values of voltage or current above which they are quite freely conductive, and below which substantially non-conductive, and these may be employed instead of mechanical relays should a completely static system be desired. For example, a flip-flop transistor amplifier, such as is shown schematically in FIG. 12, or a magnetic amplifier such as is shown schematically in FIG. 11, is such an arrangement.

The invention may be employed in the protection of polyphase circuits but a single-phase alternating current circuit operating at a power frequency such as sixty cycles per second is represented by line conductors L1 and L2. The circuit is sectionalized by a circuit breaker CB having a trip coil CBT and an auxiliary switch CBA which is closed only when the circuit breaker is closed.

Figure 2:
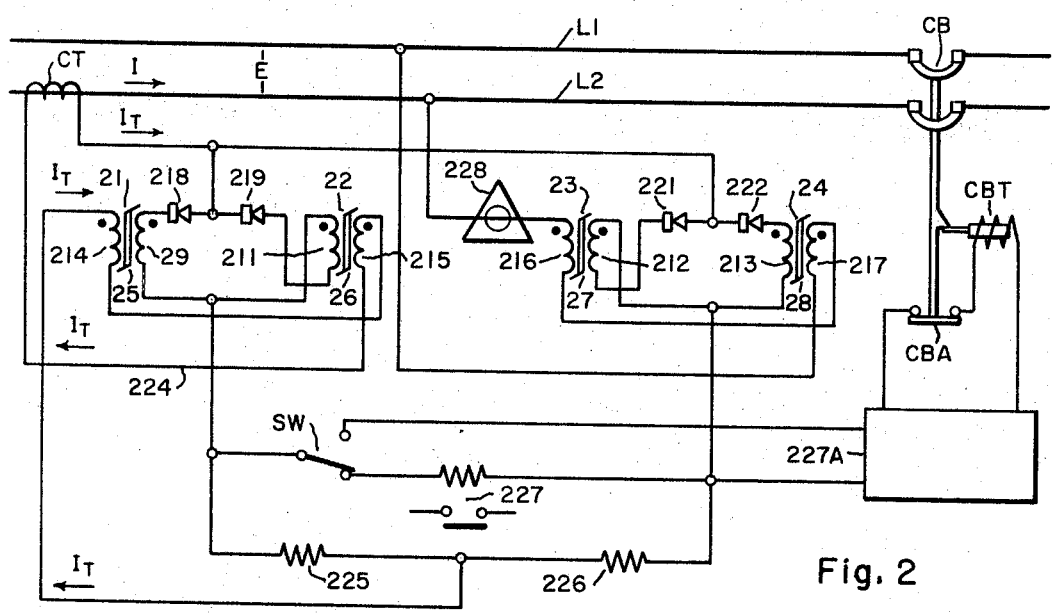
FIG. 2 is a schematic diagram of a single-phase circuit reactance-type relay embodying principles of my invention.

FIG. 2 shows a circuit which yields a reactance relay having a characteristic curve of the type shown in FIG. 1. On this schematic 21, 22, 23 and 24 respectively denote four magnetic amplifiers comprising magnetic cores 25, 26, 27 and 28, gate windings 29, 211, 212 and 213, and control windings 214, 215, 216 and 217. The gate windings and the control windings are wound to have no mutual inductance relative to each other, as is standard design for magnetic amplifiers. An article by S. R. Hoh in the periodical Tele-Tech and Electronic Industries, published by Chilton Company, Philadelphia, Pa., May 1953, pp. 68–71 and 135–141, and June, pp. 114–115 and 176–177, shows a magnetic amplifier suitable for the above-mentioned service. The gate windings each has a rectifier respectively 218, 219, 221 or 222 in series with it, these rectifiers permitting current flow in the directions in which their arrow-heads point, this resulting, as can readily be seen in the magnetic amplifiers 29 and 212 carrying one half cycle of any alternating current impressed on their terminals, and amplifiers 211 and 217 carrying the succeeding half-cycle. In consequence the successive half-cycles of current maintain a saturating effect on their associated magnetic cores which is substantially proportional to the current values of the half waves, as is usual in magnetic amplifiers. Through lines 223 and 224 these magnetic amplifier windings are supplied with current $I_T$ from the secondary of a current transformer CT energized by line current I of the single-phase alternating-current circuit, for amplifiers 21 and 22 through a resistance element 225, and for amplifiers 23 and 24 through a resistance element 226. The resistors 225 and 226 have a common junction connected to one terminal of the secondary of the current transformer CT through the line 224, and are so poled that their remote terminals are of like polarity. It will be seen that on one half-cycle of alternating current flow in lines 223 and 224 the windings 29 and 212 wil send their respective currents through resistors 225 and 226 so that the voltage between their remote ends will be proportional to the difference between said currents; and, on the succeeding half-cycle the windings 211 and 213 will respectively send half-waves of current through resistors 225 and 226 in such directions that the voltage between said remote ends will again be proportional to the difference between these second half-waves. When the half-cycles of current in resistors 225 and 226 are in a predetermined ratio to each other, the voltage between the remote ends will, of course, be zero, and at all other times, when the current through resistor 225 overbalances that through resistor 226 the voltage-drop through resistor 225 will outbalance that through resistor 226; and vice versa. The resistance elements 225 and 226 will thus constitute output circuits powered by the magnetic first amplifier 21 and second magnetic amplifier 23 respectively which are first and second energizing means and if a device 227 embodying substantial resistance, such as a polar relay device controlling contacts in the current-supply trip circuit of a circuit breaker of the alternating current line associated with lines 223, 224 is connected across the remote terminals or resistance elements 225 and 226, such polar relay device will be responsive to the difference between the outputs of said magnetic amplifiers. For the purposes of this application, the ends of the gate windings farthest from the line 223 will be referred to as their output ends.

The device 227 is illustrated as energized through contacts of a switch SW which for present purposes has the position illustrated in FIG. 2.

The control windings 214 of magnetic amplifier 21 and 215 of magnetic amplifier 22 are traversed by current proportional to that in the alternating current power line, and the control windings 216 of magnetic amplifier 23 and 217 of magnetic amplifier 24 are supplied with a voltage proportional to, but in quadrature with, the voltage of said alternating current line. Such quadrature relation may be effected through a ninety degree phase-shifting network 228 in ways well-known in the art.

Each of the magnetic amplifiers 21 and 22 will then supply to the resistance element 225 a half-wave of current proportional to the square of the current $I^2$ in the alternating current line, such half-waves following each other in alternation. The magnetic amplifiers 23 and 24 will supply to the resistance element 226 successive half-waves of current proportional to $EI \sin \theta$ where E is the voltage of, and I the current in, the alternating current line; and $\theta$ the phase angle between I and E. This expression represents the reactive power of the line. When the voltage-drop in resistor 225 just balances the voltage-drop in resistance element 226, so that the voltage across polar-relay device 227 is zero as mentioned above, the first of these voltage-drops, being proportional to $I^2$ must just equal the second voltage drop which is proportional to $EI \sin \theta$; i.e. $K_1I^2 = K_2EI \sin \theta$ where $K_1$ and $K_2$ are design constants of the magnetic amplifiers 21 and 23.

When a short circuit or fault occurs on the transmission line, a limitation on current-flow to the fault is, as has been pointed out, the reactance of the line conductors between the relay station and the fault; and to a first approximation the line voltage E at the relay station is driving the current I through this reactance; so that $$E \sin \theta = IX_L$$

where $X_L$ is this line reactance. Substituting this expression for E in the equation of the preceding paragraph gives $K_1I^2 = K_2X_LI^2$; hence $K_1/K_2 = X_L$. In other words, when the polar relay device is just at a balance, the reactance between the relay point on the line and the fault has a definite value which may be fixed by design constants of the arrangement. But since the line reactance $X_L$ is itself proportional to distance along the line from relay to fault, it is possible, by proper adjustment of design constants, to make the balanced condition of the polar relay device occur only for a predetermined fault distance. For shorter fault distance the relay will be unbalanced in a direction which may be made to cause tripping of the line circuit breaker; for greater fault distance the relay is actuated in a directon which causes no tripping or disturbance of the alternating current line. A reactance-type relay, responding to faults within a predetermined line stretch or distance, but indifferent to more remote faults is thus attained by the FIG. 2 arrangement.

The performance of the FIG. 2 arrangement has just been described with reference to magnetic amplifiers 21 and 23; and the system would be entirely operative were the magnetic amplifiers 22 and 24 not employed. This would be simpler and less costly than the full arrangements shown in FIG. 2, but would respond only for every other half-cycle of current in the alternating current line. The magnetic amplifiers 22 and 24 may be employed when response to faults occurring within any half-cycle of the line power is desired. The magnetic amplifiers 22 and 24 act in the same way as has been described above for amplifiers 21 and 23, except that they send half-waves of current through resistors 225 and 226 in the half-cycle intervals between the current pulses from the latter. It is believed that detailed description of current-flow from amplifiers 22 and 24 is accordingly superfluous.

Although the resultant voltage across the resistors 225 and 226 may be applied to a polar relay 227 which controls the tripping circuit of a circuit breaker, other arrangements may be employed. It will be assumed that the switch SW is operated to transfer the resultant voltage across the resistors 225 and 226 from the polar relay 227 to the input terminals of an amplifier 227A of any suitable construction. The output of the amplifier is connected through the auxiliary switch CBA across the trip coil CBT to control the tripping of the circuit breaker.

The FIG. 2 arrangement is described as applied to a single phase of an alternating circuit, but a polyphase circuit having a neutral conductor may have the line current and voltage between any phase conductor and the neutral conductor treated as a single-phase circuit, and so have a FIG. 2 arrangement applied to each such pair of conductors.

Figure 3:
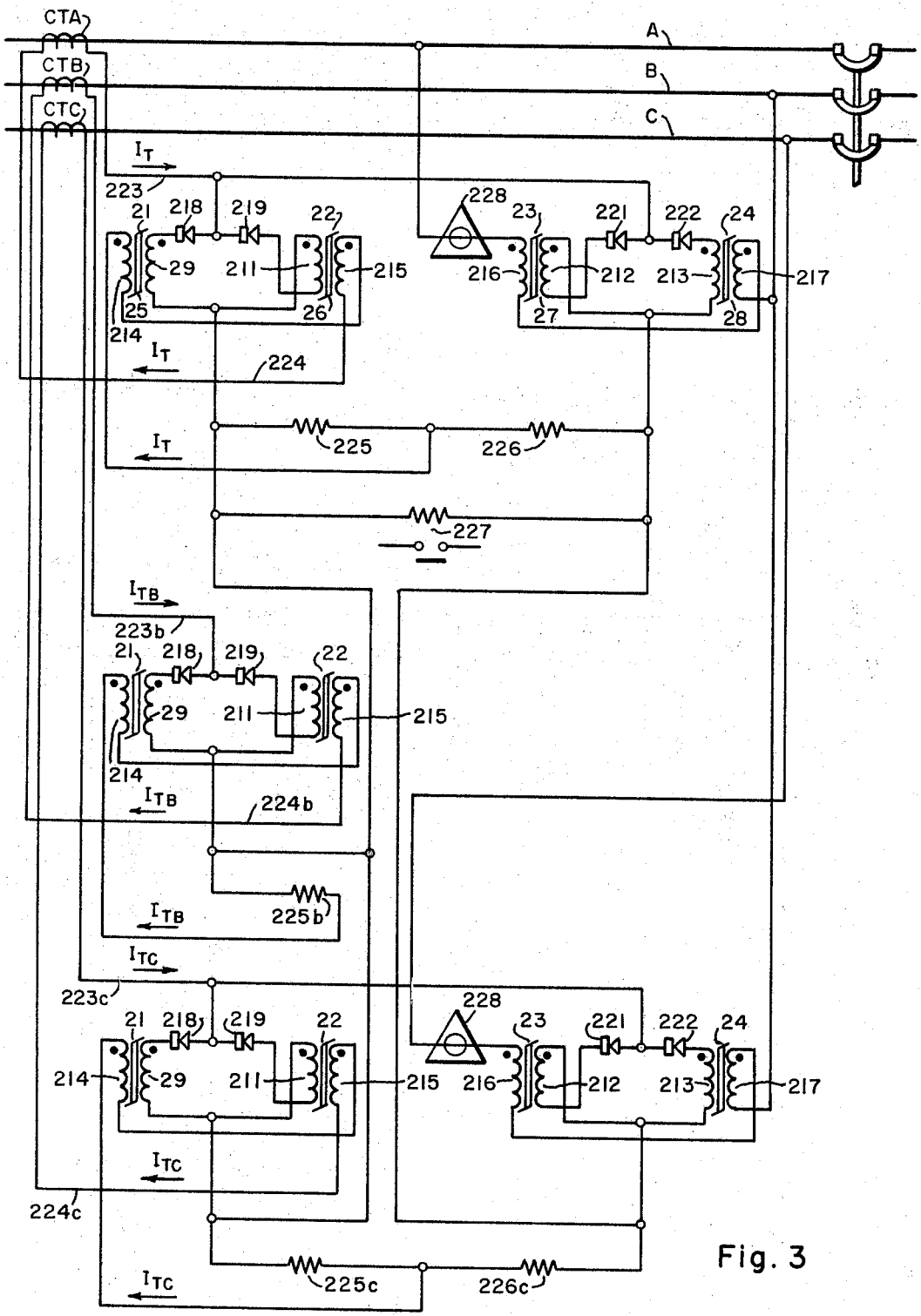
FIG. 3 is a similar diagram of a relay embodying the principles of my invention for a three-phase, three-wire circuit.

A polyphase circuit having no neutral conduction does not require an entire FIG. 2 network for each phase. One phase may have the magnetic amplifiers 23 and 24 omitted. This is illustrated in FIG. 3 for a three-phase transmission line having phase conductors A, B and C. A first set of circuit elements like those of FIG. 2 are similarly numbered and derive their input current from a current transformer CTA associated with the phase conductor A and input voltage from the voltage across the line conductors A and B. A second set of circuit elements like those of FIG. 2 are similarly numbered and derive their input current from a current transformer CTC associated with the phase conductor C and input voltage from the voltage across the phase conductors C and B. Resistance elements 225C and 226C for the second set correspond to the elements 225 and 226 of FIG. 2.

A third set of magnetic amplifiers 21 and 22 similar to the correspondingly numbered amplifiers of FIG. 2 derive their input current from a current transformer CTB associated with the phase conductor B. However a third set of magnetic amplifiers analogous to the amplifiers 23 and 24 of FIG. 2 is not required. A resistance element 225b is associated with the third set of magnetic amplifiers 21 and 22, and corresponds to the element 225 of FIG. 2. However, a third resistance element corresponding to the resistance element 226 of FIG. 2 is not required. A single polar relay device 227 corresponding to the device 227 of FIG. 2 has one input terminal connected to the left-hand terminals of the resistance elements 225, 225b and 225c as shown in FIG. 3. The remaining input terminal of the relay device 227 in FIG. 3 is connected to the right-hand terminals of the resistance elements 226 and 226c.

In the arrangement of FIG. 3 the polar relay device 227 is energized when a fault occurs involving at least two of the phase conductors A, B and C. The energization depends on the distance of the fault from the relay station in the manner discussed with reference to FIGS. 1 and 2.

The two sets of control windings 216, 217 may be said to be open-delta or V-connected. The output ends of the gate windings of all of the magnetic amplifiers 21, 22 are connected to one terminal of the polar relay device 227 in FIG. 3 and these windings may be said to be star or Y-connected. The output ends of the gate windings of all of the magnetic amplifiers 23, 24 are connected together to the other terminal of the device 227 and these gate windings may be said to be open-delta or V-connected.

Figure 4:
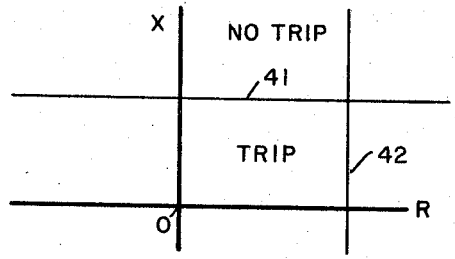
FIG. 4 is a graph of the same type as FIG. 1 for the characteristic curve of a resistance-supervised reactance-type relay in accordance with my invention.

While the arrangements of FIGS. 1 to 3 describe pure reactance-type relays, there are many cases where a modified arrangement would be preferable. A relay characteristic shown in FIG. 4 is frequently considered more desirable and is plotted on the same coordinate axes employed for FIG. 1. In FIG. 4 the line 41 represents a value of circuit reactance below which the relay will trip its associated circuit breaker unless the resistance of the circuit which the relay finds itself "looking into" is greater than that corresponding to the vertical line 42. Thus the relay is actuated to a tripping condition only for some value of circuit impedance represented by a point within the rectangle bounded by the R and X coordinate axes and the lines 41 and 42. The FIG. 2 type relay may be supervised to make the X axis an operation-boundary by bringing in a directional relay device which blocks actuation of the tripping device for the circuit breaker unless power-flow on the alternating current circuit is in one direction, and not the other direction. FIG. 5 is a schematic diagram of such a directional relay device. The FIG. 2 type relay may also be supervised to make any desired vertical line 42 an operational boundary by providing a resistance-type relay device such as the arrangement shown in FIG. 6.

Referring to FIG. 5, a pair of magnetic amplifiers 21 and 21a like those respectively numbered 21 and 23 in FIG. 2 are connected to feed the respective output currents from their rectifier circuits in voltage-opposition to two resistance elements 225 and 226 similar to the similarly numbered resistance elements in FIG. 2. The control windings 214 and 216 are traversed in series by currents proportional to the alternating circuit current I. A polar relay device 227D has impressed upon it the voltage between the remote terminals of resistance elements 225 and 226, and is so energized as to actuate a tripping contactor in a circuit breaker tripping circuit or to exercise a desired control only when the voltage of resistance element 226 outbalances that of resistance element 225, just as do the resistance elements of similar numbers in FIG. 2. Unlike the windings 29 and 212 in FIG. 2, however, the gate windings 53 and 54 of magnetic amplifiers 21 and 21a of FIG. 5 are energized by a voltage proportional to and in phase with the alternating current line voltage E. The gate windings 53 and 54 are so poled relative to control windings 214 and 216 that when output from winding 53 through rectifier 55 through resistance element 225 tends to make the remote terminal of the latter more largely positive the output of gate winding 54 tends to make the remote terminal of resistance element 226 less positive. If now direction of current flow in windings 214 and 216 were changed by 180 electrical degrees, the phase of the line voltage E on lines 51 and 52 being unchanged, the polarity of the voltages impressed by windings 53 and 54 on the circuit would so change that the remote terminal of resistance element 225 would be made less positive while the remote terminal of resistance element 226 would be made more positive. In short, a change in direction of current I in the line without change in line voltage E will result in reversing the polarity of voltage at the terminals of polar relay 227D, and changes it from a nontrip to a tripping condition for its associated line circuit breaker. If a fault occurs at a point in one direction along the alternating current line from the relay station, the current to the fault will have one direction, and if the fault is on the other side, the fault current will flow in the other direction; but only one direction of such flow, where the FIG. 5 relay is in use, will result in tripping the circuit breaker. Thus the relay responds only to faults in one direction from the relay station, and is a directional-type relay.

The foregoing description considers the presence of only the amplifiers 21 and 21a in FIG. 5 and the arrangement is entirely operative if amplifiers 22 and 22a are not present. However, it then suffers the same limitations as were pointed out for FIG. 2 when amplifiers 22 and 24 were absent therein, and the presence of amplifiers 22 and 22a in FIG. 6 renders the latter responsive to transmission line faults within a time delay of the order of one half-cycle. Magnetic amplifiers 22 and 22a are similar respectively to amplifiers 21 and 21a and are poled to produce similar effects with negative half waves of line current I on polar relay device 227 to those just ascribed to magnetic amplifiers 21 and 21a with respect to the positive half-waves. More detailed description of the amplifiers 22 and 22a in FIG. 5 is considered unnecessary.

FIG. 6 shows a relay system adapted to insure against tripping response by the associated circuit breaker when the resistance of the circuit faced by the relay exceeds a predetermined value (e.g. that represented by the line 42 in FIG. 4) even though the reactance of that circuit be below the critical set value of the reactance (i.e. line 41, FIG. 4). The arrangement embodies magnetic amplifiers of the type of those in FIG. 2, and their circuit connections differ from the latter only in that the voltage impressed on the control windings 216 and 217 is proportional to and cophasal with, the line voltage E instead of being in quadrature with the voltage E. In consequence the voltage-drop in resistance element 226 is proportional to $EI \cos \theta$, the voltage-drop in resistance element 225 being, as in FIG. 2, proportional to $I^2$ where I is current in the alternating current line. Again, at balance of the polar relay device 227E (which corresponds to the device 227 of FIG. 2), $K_1I^2 = K_3IE \cos \theta = K_2I^2R$, where R is resistance of the stretch of line between the relay station and the fault (which again is proportional to the fault distance), and $K_1$ and $K_3$ are design constants. As in the case of the reactance relay of FIG. 1 it is possible, by proper choice of these design constants to make the polar relay device balance point representative of a predetermined desired distance along the line, and have that device take up a circuit breaker tripping position only for fault distances of lesser magnitude.

Figure 7:
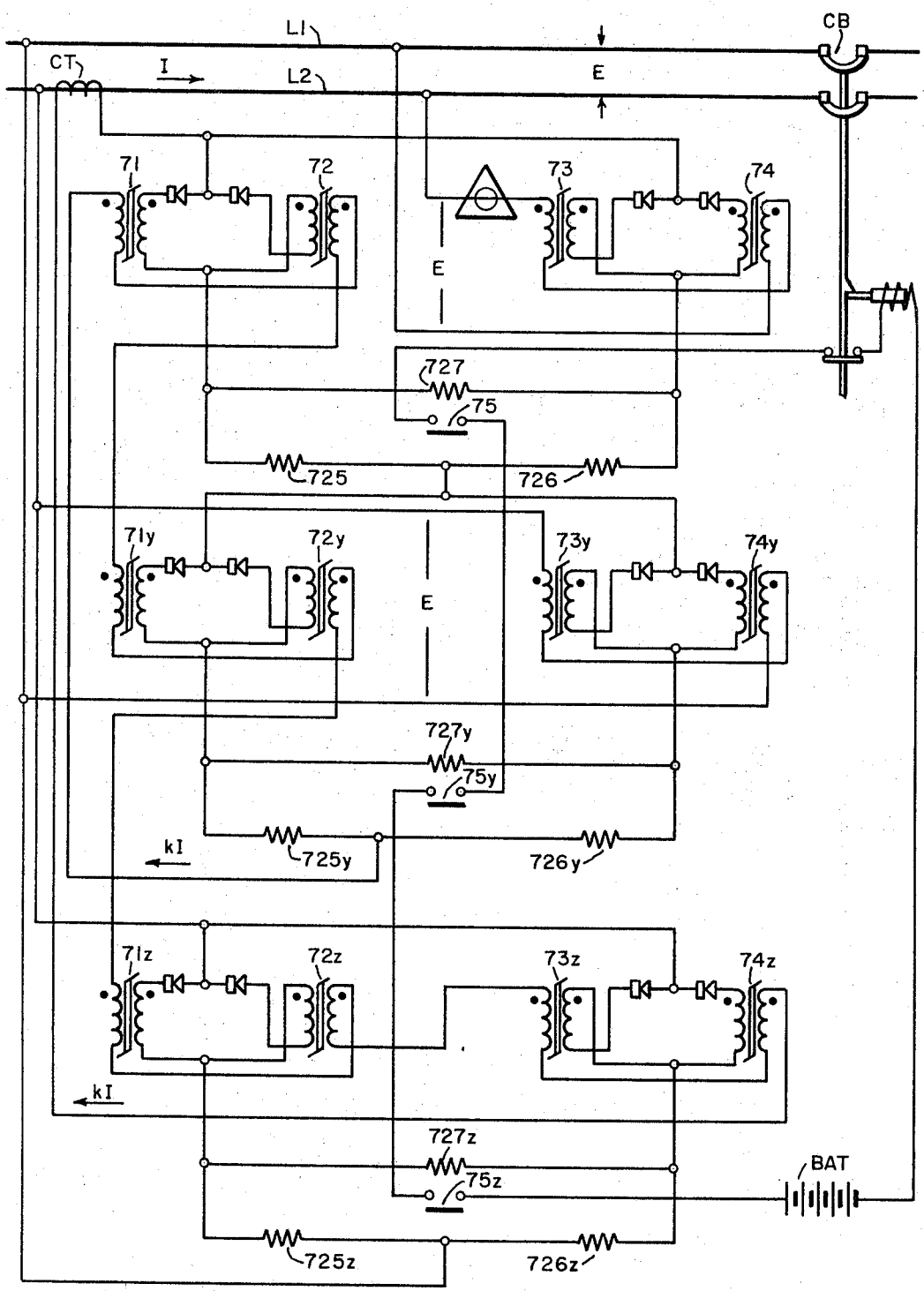
FIG. 7 is a schematic diagram of a relay system of the resistance supervised reactance-type for a single-phase line which protects against faults located in a stretch of line on one side only of the relay.

In FIG. 7 are shown by schematic diagram the arrangement for relaying a single-phase alternating current line with an overall relay characteristic of FIG. 4. It comprises magnetic amplifiers 71, 72, 73 and 74 respectively similar to magnetic amplifiers 21, 22, 23 and 24 of FIG. 2 supplying currents to resistance elements 725 and 726 which are similar to resistance elements 225 and 226 in FIG. 2, and which are shunted by a polar relay device 727 similar to polar relay device 227 in FIG. 2. The polar relay device controls the opening of a pair of contacts 75 in the tripping circuit of a circuit breaker CB which is in a portion of the alternating current line, and energizes that circuit when the reactance which the magnetic amplifiers 71, 72, 73, 74 find themselves "looking into" is less than that indicated by the line 41 in FIG. 4. The control windings of the magnetic amplifiers 71 and 72 are traversed by a current $kI$ proportional to the line current I of the alternating current line, and the control windings of amplifiers 73 and 74 are impressed with a voltage proportional to, and in quadrature with, the voltage E of the alternating current circuit L1, L2.

As in the case of FIG. 2 the magnetic amplifiers 72 and 74 may be omitted if desired, with a decrease in response from half-cycle to full-cycle time period. Current proportional to the line current I is fed to the gate windings of amplifiers 71, 72, 73 and 74 from the current transformer CT.

Magnetic amplifiers 71y, 72y, 73y, 74y respectively similar to amplifiers 21, 22, 23 and 24 in FIG. 6 energize resistance elements 725y, 726y similar to the resistance elements 225 and 226 in FIG. 6, and, like the arrangements in that figure, provides a resistance-type relay controlling a pair of contacts 75y in the tripping circuit of circuit breaker CB so that the tripping circuit can be energized to tripping condition only when the resistance which the amplifiers 71y, 72y, 73y and 74y find themselves "looking into" less than that represented by the vertical line 42 in FIG. 4. The junction between the rectifiers in the gate circuits of both sets of amplifiers 71y, 72y and 73y, 74y are connected to the common junction of resistance elements 725 and 726, and the common junction of resistance element 725y and 726y are connected for energization proportional to alternating line I. The control windings of magnetic amplifiers 71y and 72y are supplied with current proportional to the current I of the alternating current line, and the control windings of amplifiers 73y and 74y are impressed with a voltage E proportional to, and cophasal with, that of said line.

As in the case of FIG. 6, the amplifiers 72y and 74y may be omitted if it is preferred to do so while submitting to full-cycle timing of relay response instead of half-cycle time. The relay arrangement controlling contacts 75y are evidently given the properties of a resistance-type relay.

The magnetic amplifiers 71z, 72z, 73z and 74z are similar to amplifiers 21, 22, 21a and 22a in FIG. 5, and are similarly linked into circuit so that they produce in effect a directional type relay governing a pair of contacts 75z in the tripping circuit of circuit breaker CB. The circuits of the gate windings of each of these amplifiers are impressed with a voltage E proportional to, and cophasal with, the voltage of the alternating current line, just as are the analogous gate windings in FIG. 5. The control windings of amplifiers 71z, 72z, 73z and 74z are like those of the amplifiers in FIG. 5, traversed by a current proportional to the current I in the alternating current line, and the amplifiers 71z, 72z, 73z and 74z have their windings poled similarly to those in FIG. 5. The contacts 75z are accordingly governed in accordance with those of a directional relay. As in the case of FIG. 5 the amplifiers 72z and 74z may be omitted when the user is willing to sacrifice the utmost promptitude of response of contacts 75z to faults. These contacts only close when the fault is positioned in the selected direction from the relay station.

Summarizing the operation of the arrangement of FIG. 7, the contacts 75 close to permit a tripping operation of the circuit breaker CB from a source of current represented by a battery BAT only if a point representing the line reactance between the relay station and a line fault falls below the line 41 in FIG. 4.

The contacts 75y close to permit a tripping operation of the circuit breaker CB only if a point representing the line resistance between the relay station and a line fault is to the left of the line 42 in FIG. 4.

The contacts 75z close to permit a tripping operation of the circuit breaker CB only if a point representing the line resistance between the relay station and a line fault is on the right of the coordinate axis X in FIG. 4.

A polyphase alternating current transmission network having a neutral wire may be provided with a relay arrangement like FIG. 7, for each phase, treating the circuit between the neutral and each line wire as a single-phase circuit. A polyphase system with no neutral wire is exemplified in FIG. 8 which shows a three-phase line arrangement in block diagram. There the three line-wires of a three-phase system are designated 81, 82 and 83 and are shown as entering a block 80 which has the internal circuit arrangement of magnetic amplifiers appearing in FIG. 3. The polar relay 85, corresponding to the relay 227 in FIG. 3, controls a pair of contacts in the tripping circuit of circuit breaker 86 controlling a portion of the three-phase system so that the latter cannot be tripped unless the reactance faced by the arrangement in block 80 is below the value corresponding to line 41 of FIG. 4.

The block 80y contains the magnetic amplifier arrangement of FIG. 6, all gate windings and the control windings of amplifiers 21 and 22 being fed current proportional to the current in one alternating current line wire, and the control winding of amplifiers 23 and 24 impressed with a voltage proportional to that between that and another three-phase line wire. The relay 85y corresponding to the relay 227E in FIG. 6 governs a pair of contacts in series with the tripping coil CBT for the circuit breaker and prevents energization of the latter to tripping condition unless the resistance "looked into" by the relay in block 80y is below the value represented by the line 42 in FIG. 4. If desired, the arrangement in block 80y could be made additionally responsive by employing the circuit shown in FIG. 3 with the phase-shift networks 228 omitted, thereby impressing on the control winding of amplifiers 23 and 24 the line voltages.

Figure 8:
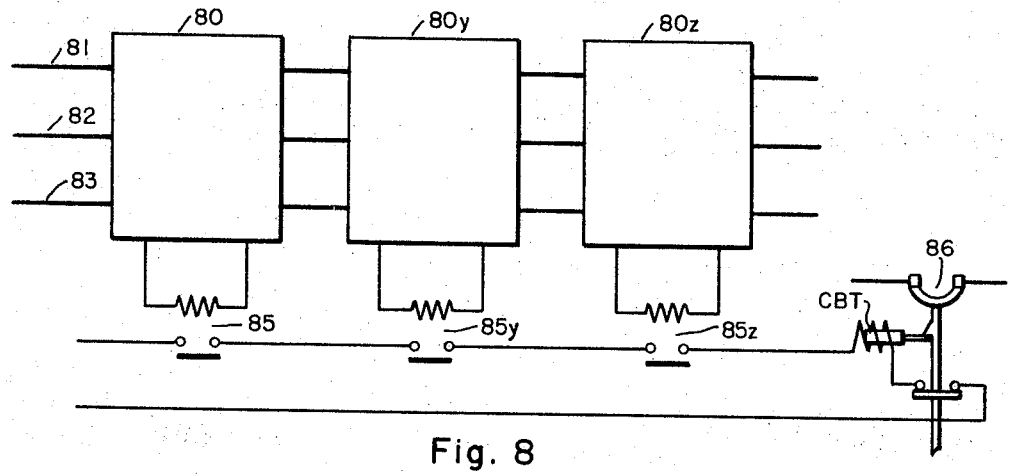
FIG. 8 is a block-diagram of a protective relay of the type of FIG. 7 applied to a three phase-line.

The block 80z in FIG. 8 may embody the magnetic amplifiers and connections of FIG. 5, the polar relay device 85z corresponding to that numbered 227D in FIG. 5 and governing a pair of contacts in the circuit of tripping coil CBT for circuit breaker 86 so that the tripping may be energized when current flows along the laternating current line in the selected direction. The voltage between the wires corresponding to 51 and 52 of FIG. 5 may be proportional to the line-to-line voltage of one phase of the three-phase line, and the current through the control windings of the magnetic amplifiers be proportional to that flowing in one line wire of the three-phase line.

The circuits in block diagram may be worked out for current-flow in all three-phase line-wires in ways that would be evident to those skilled in the electrical art.

Figure 9:
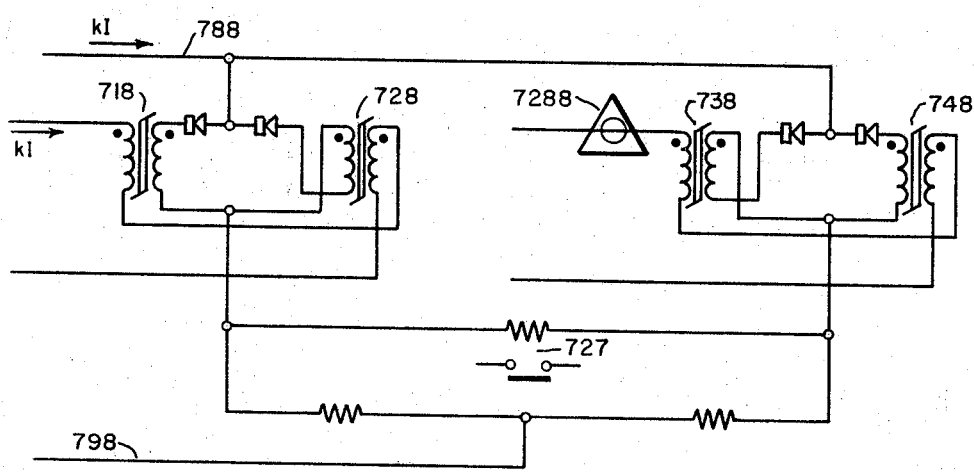
FIG. 9 is a schematic diagram of a modification of the reactance relay of FIG. 2 applied to a single-phase circuit of lower first-cost, and likely to be satisfactory for certain services.
Figure 10:
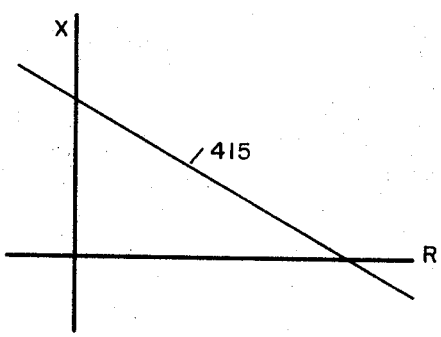
FIG. 10 is a graph of the same type as FIG. 1 but having a different characteristic curve.

For many purposes the functions of the pairs of amplifiers 71 and 71y, 72 and 72y, 73 and 73y, 74 and 74y in FIG. 7 may be effected satisfactorily enough at a substantial saving of expense by the arrangement shown in FIG. 9 in which the magnetic amplifiers 718, 728, 738 and 748 are of the same structure as amplifiers 71, 72, 73 and 74 of FIG. 7 and leads 788 and 798 are traversed by current kI proportional to the current I in the alternating current line. The control windings of the amplifiers 718 and 728 are also traversed by current proportional to current I, but the voltage impressed on the control windings of amplifiers 738 and 748 is a voltage proportional to the voltage E of the alternating current line, and phase displaced relative thereto by an adjustable phase-shifting network 7288. Such phase-shifting networks are believed to be too well-known in the art to require description here. Thus by adjusting the phase-shifting network 7288 a modified reactance-resistance characteristics would be attained. Such a characteristic is shown for example in FIG. 10. The relay 727 of FIG. 9 would operate to close the contacts only for impedance values "seen" by the relay arrangement of FIG. 9 which fall below the curve 415 of FIG. 10. This curve is shown as a straight line having an angle relative to one of the coordinate axes which may be adjusted by adjustment of the angle of phase shift introduced by the phase shifter 7288.

I have briefly described a form of polar relay device of a mechanical type having moving parts, but relays of a static type devoid of mechanical movement are known and may be employed where desired in the above described arrangements. FIG. 11 shows one such device. It comprises a pair of magnetic amplifiers 101 and 102 having windings 103 and 104 supplied from a direct current bias-source and windings 105 and 106 serially connected and having their remote terminals adapted for connection to the remote terminals of the resistance elements 225 and 226 in FIG. 2. These amplifiers also have windings 107 and 108 having one pair of homologous ends connected to an alternating voltage-source 109, and their other ends interconnected through a pair of rectifiers 111 and 112 having their like poles adjacent. The tripping coil CBT of the associated main line circuit breaker is connected from a mid-tap on the source 109 and the junction of the rectifiers 111 and 112.

In FIG. 12 I show still another type of static circuit which may act as the polar relay device in the arrangements of FIGS. 2, 3, and 5 through 9. The positive pole of a local direct current source is connected through a lead 113, a resistor 114 and the collector and emitter of a transistor 115 to the lead 116 for the negative pole of that source. A second branch-circuit connects the lead 113 through a resistor 117 and a transistor 118 to the lead 116. The tripping coil CBT of a controlled circuit breaker is connected from lead 116 to the collector of transistor 115, and also through a resistor 120 to the base electrode of transistor 118. The collector of transistor 118 is connected to the base electrode of transistor 116 through a resistor 121. The remote terminals of resistance elements 225 and 226 of FIG. 2 may be connected to the base electrode of transistor 118 and lead 116. It will be recognized that the FIG. 12 circuit is a flip-flop transistor amplifier. Although the circuit may be arranged for PNP transistors the transistors shown in FIG. 12 are of the NPN type.

I claim as my invention:

1. In combination with an alternating current line, a protective device comprising first energizing means powered in proportion to the square of current in said line, a second energizing means powered in proportion to the reactive power of said line, and means responsive to the difference between the power of said first energizing means and that of said second energizing means to control current flow in said line.

2. The arrangement described in claim 1 wherein said first energizing means comprises a first magnetic amplifier having its gate winding and its control winding energized in proportion to the line current, and said second energizing means comprises a second magnetic amplifier having its gate winding energized in proportion to the line current and its control winding energized by a voltage proportional to, and in quadrature with, the voltage of said line, each gate winding embodying a rectifier, and a polar device actuated in accordance with the difference between the outputs of said magnetic amplifiers.

3. In combination with an alternating current line, a relay comprising a first and a second pair of magnetic amplifiers, each magnetic amplifier having a gate winding and a control winding, means for energizing all said gate windings in proportion to the current in said line and for energizing the control windings of said first pair proportionally to said current, means for energizing the control windings of said second pair with a voltage which is proportional to, and in quadrature with, the voltage of said line, each of said gate windings embodying a rectifier, and a polar relay device actuated in accordance with the difference between the respective output of said magnetic amplifiers.

4. In combination with a three-phase alternating current system, a relay comprising an arrangement such as is described in claim 2 as the first magnetic amplifier in each line wire of said system, and two arrangements each such as is described in claim 2 as to the second magnetic amplifier, each having its control winding energized by a delta voltage of said three-phase system, and means for connecting the gate windings of said first magnetic amplifiers in Y to one pole of a polar relay device, and connecting the other pole of said polar relay device to the V-connected windings of said second amplifiers.

5. In combination with an alternating current line, a protective device comprising a first energizing means powered in proportion to the square of current in said line, a second energizing means powered in proportion to the power of said line, and means responsive to the difference between the power of said first energizing means and said second energizing means to control current flow in said line.

6. The arrangement described in claim 5 wherein the first energizing means comprises a magnetic amplifier having its gate winding and its control winding energized in proportion to the line current, and said second energizing means is a magnetic amplifier having its gate winding energized in proportion to line current and its control winding energized by a voltage proportional to and cophasal with the voltage of said line, each said gate winding embodying a rectifier and said rectifier output actuating a polar relay device.

7. In combination with an alternating current line, a relay comprising a first and a second pair of magnetic amplifiers each having a gate winding and a control winding, means for energizing said gate windings in proportion to the current in said line, each said gate winding embodying a rectifier, means for energizing the control windings of said first pair in proportion to the current in said line, means for energizing the control windings of said second pair in proportion to, and cophasally with, the voltage of said line, a polar relay device, and means for actuating it in accordance with the difference between the output voltage of the rectifier circuit of said first pair from that of said second pair.

References Cited by the Examiner

UNITED STATES PATENTS

| 2,594,022 | 4/1952 | Horton | 317—36 |
| 3,163,802 | 12/1964 | Seguin et al. | 317—36 |
| 3,210,606 | 10/1965 | Calhoun | 317—36 |

MILTON O. HIRSHFIELD, *Primary Examiner.*

J. D. TRAMMELL, *Assistant Examiner.*